United States Patent [19]
Morris

[11] Patent Number: 5,353,782
[45] Date of Patent: * Oct. 11, 1994

[54] ROOFING TORCH

[76] Inventor: Paul L. Morris, 8815 W. 104th St., Overland Park, Kans. 66212

[*] Notice: The portion of the term of this patent subsequent to May 18, 2010 has been disclaimed.

[21] Appl. No.: 62,191

[22] Filed: May 17, 1993

Related U.S. Application Data

[63] Continuation-in-part of Ser. No. 880,235, May 8, 1992, Pat. No. 5,211,158.

[51] Int. Cl.$^5$ ................................................ F23C 5/00
[52] U.S. Cl. ..................... 126/271.2 R; 126/271.2 C; 126/401; 126/271.2 A; 156/82; 156/497; 156/579
[58] Field of Search ............... 431/344, 345, 343; 126/401, 271.2 A, 402, 403, 404, 271.2 R, 271.2 C; 156/497, 579, 82; 38/86

[56] References Cited

U.S. PATENT DOCUMENTS

| | | | |
|---|---|---|---|
| 736,149 | 8/1903 | Phipps | 126/404 |
| 2,084,625 | 6/1937 | Stebbins et al. | 156/497 X |
| 2,692,641 | 10/1954 | Woods | 126/401 |
| 3,079,980 | 3/1963 | Mihm | 126/401 |
| 3,099,582 | 7/1963 | Ongstad et al. | 156/579 X |
| 4,239,581 | 12/1980 | Lang | 126/271.2 |
| 4,259,142 | 3/1981 | Kosteperter | 156/579 X |
| 4,658,802 | 4/1987 | Schultz | 126/271.2 |
| 4,918,844 | 4/1990 | Marsh | 126/271.2 X |
| 5,211,158 | 5/1993 | Morris | 126/271.2 R |

Primary Examiner—Carl D. Price
Attorney, Agent, or Firm—Hovey, Williams, Timmons & Collins

[57] ABSTRACT

An improved torch assembly (10) especially designed for use in the formation of roof lap joints is provided which includes an elongated handle (12) having a shoe element (14) coupled to the lower end thereof and equipped with a rearwardly extending, marginal barrier wall (18). A torch (16) is secured within the shoe element (14) and is oriented for delivery of flame downwardly through the open end of the shoe element (14) and at an oblique angle relative to the barrier wall (18). Preferably, the handle (12) is in the form of an elongated tubular body (20) which is coupled to a cup-like torch head (52) secured within the confines of shoe element (14). In another embodiment, torch (10b) is provided having shoe (14b) and an adjustably positioned diverter (80) carried by the shoe (14b) for directing flame downwardly beyond the trailing edge of bottom wall (36b) of shoe element (14b). Another torch (10d) includes a diverter (94) carried by shoe (14d) which directs flame upwardly in order to preheat a material (108) prior to application thereof to an underlying deck (110).

9 Claims, 4 Drawing Sheets

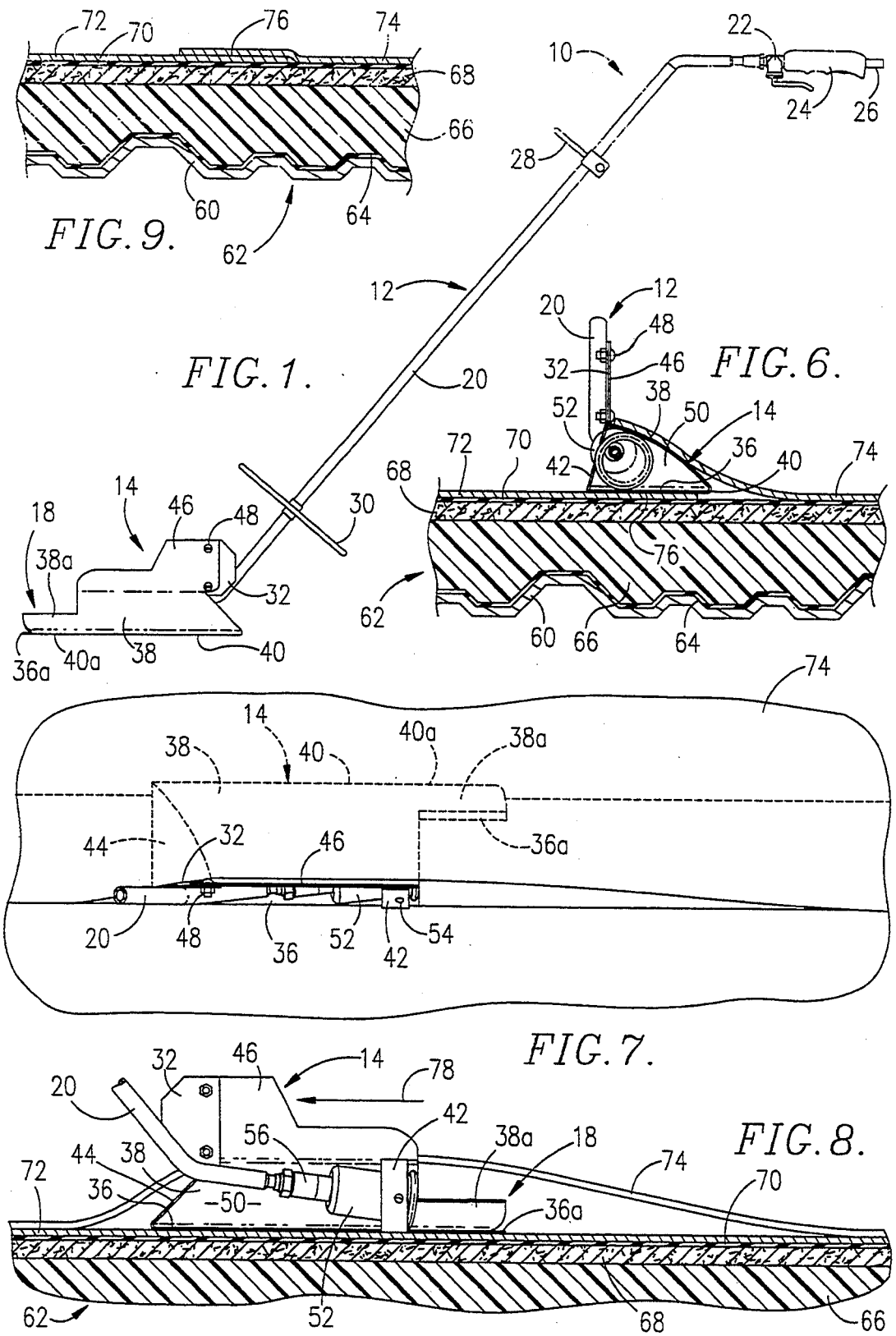

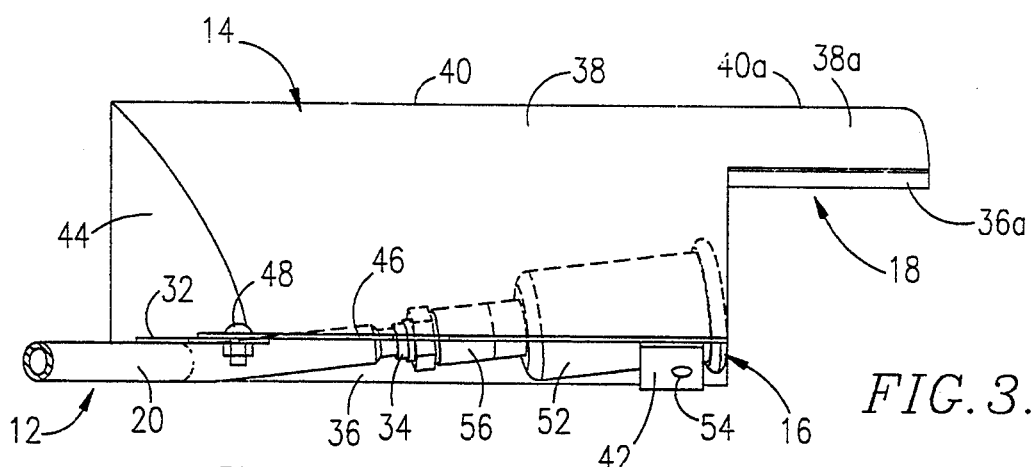
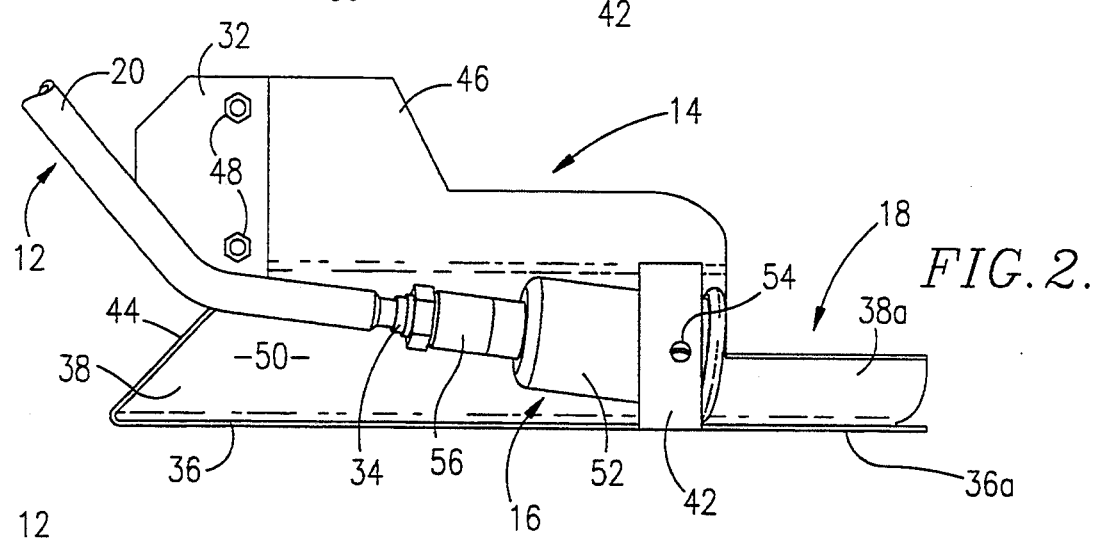
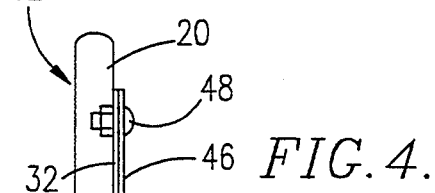
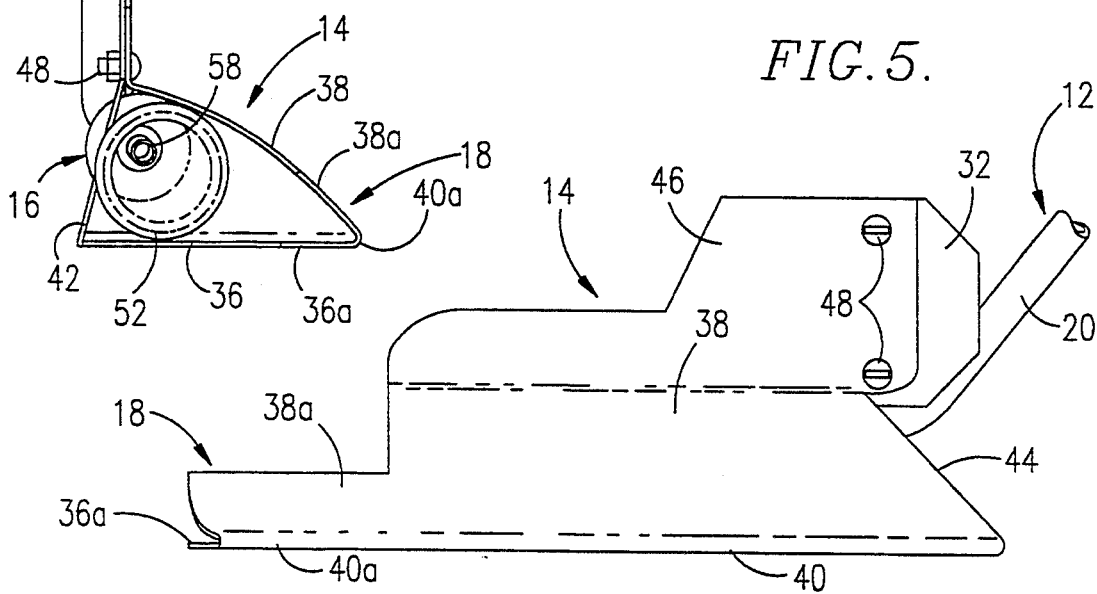

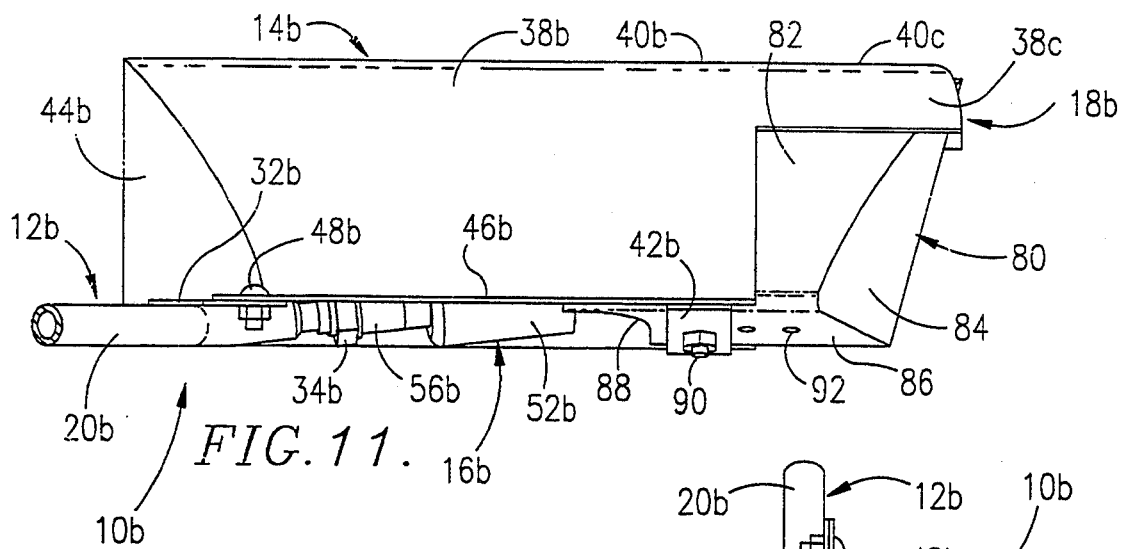
FIG. 11.
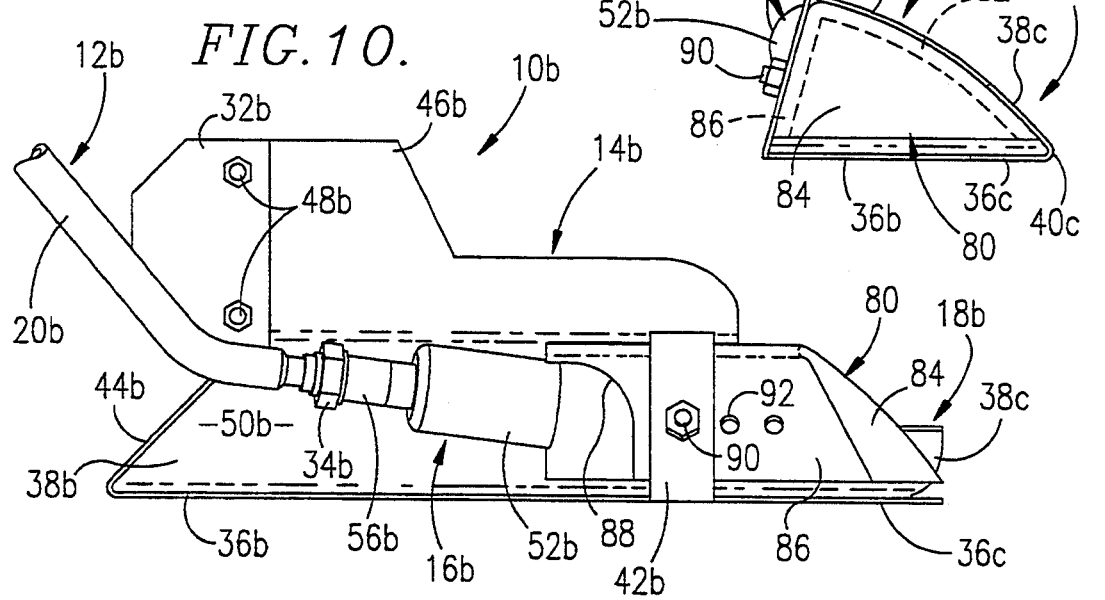
FIG. 12.
FIG. 10.
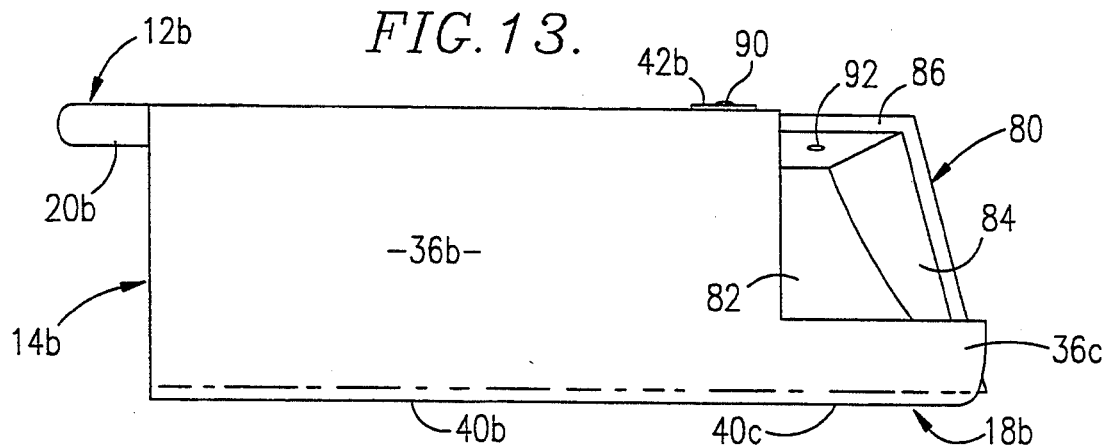
FIG. 13.

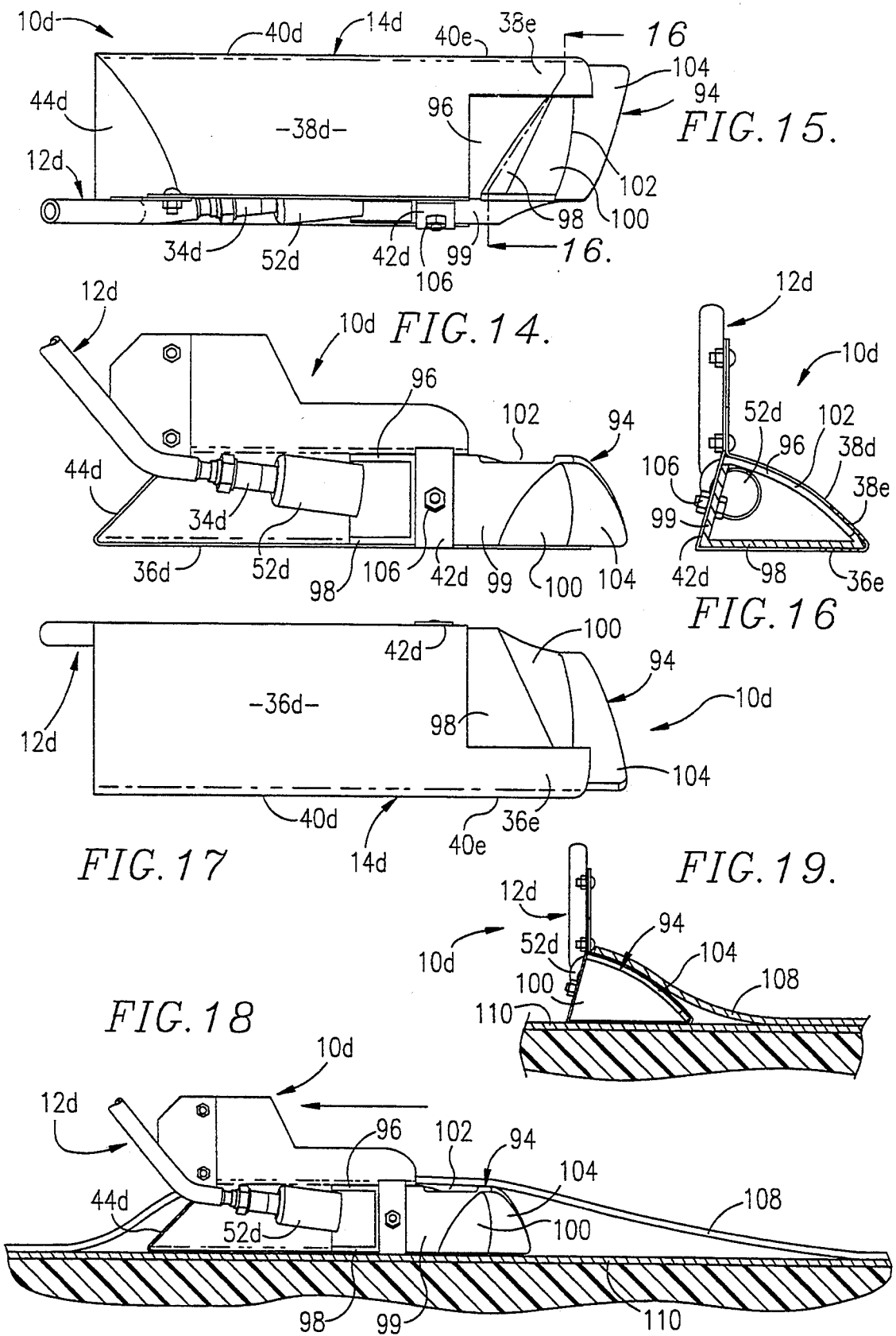

5,353,782

ROOFING TORCH

RELATED APPLICATION

This is a continuation-in-part of application Ser. No. 07/880,235, filed May 8, 1992, now Pat. No. 5,211,158 issued May 18, 1993.

BACKGROUND OF THE INVENTION

1. Field of the Invention

The present invention is broadly concerned with an improved torch assembly of the type particularly useful in roofing applications where roofing membranes must be heated for the formation of lap joints between sections of roofing material. More particularly, it is concerned with such a torch assembly including an elongated handle having a drag shoe element coupled to the lower end thereof and receiving a strategically oriented torch; the shoe element further includes a rearwardly extending flame-directing barrier wall serving to properly direct the torch flame as the assembly is pulled along a lap joint.

2. Description of the Prior Art

Many commercial roof constructions include a metal substrate having a foam insulating layer thereon, with a rigid, weather-resistant roofing board applied over the foam layer. Finally, modified bitumen roofing membrane is secured to the roofing board, typically through the use of an asphalt-based roofing mastic. Installation of such a built-up roof involves first attaching prefabricated panels each made up of preformed foam and roofing board layers over the metal deck, followed by application of roofing mastic and finally the roofing membrane. The latter material is generally provided in rolls, and successive, overlapped strips thereof are applied to the prefabricated panels and adhered in placed by the roofing mastic. The lap joints between adjacent membrane strips are also adhesively secured by heating the lap joint regions, and the membranes are rolled to complete the roof.

During formation of the lap joints, it is common to employ a trowel or other implement in one hand to lift a lap section, and hand-held torch in the other hand for the purpose of heating the membrane in and around the lap area. Thereafter, the upper layer of the lap joint is laid over the heated membrane and the joint is rolled. Use of a conventional roof torch has proven to be somewhat troublesome and difficult. Specifically, elevating the lap section and playing a torch flame over roofing membranes inevitably leads to uneven heating and consequent poor lap joint welding. Hence, the lack of suitable means for orienting the torch and maintaining its position as a lap joint is traversed is a major problem, and this increases the time spent in properly forming a lap joint. Moreover, the finished joints may be deficient and subject to failure due to wind lifting.

SUMMARY OF THE INVENTION

The problems outlined above are solved by the present invention which provides a torch assembly for use in fabricating roof joints or the like wherein the torch head is properly oriented and maintained in position to effectively heat the a lap joint area of roofing membrane. To this end, the assembly of the invention includes an elongated handle presenting an upper and lower end, with a shoe element operably coupled to the lower end of the handle and having upper and lower wall sections cooperatively defining laterally spaced apart side margins and rearwardly opening, torch-receiving cavity. The shoe further includes an elongated flame-directing barrier wall extending rearwardly and along one of the side margins of the shoe. A torch is located within the cavity and is oriented for delivery of flame downwardly through the rearward open end of the shoe, and at an oblique angle relative to the longitudinal axis of the barrier wall.

In preferred forms, the handle is in the form of an elongated gas delivery tube operably coupled to the torch, and a valve associated with the handle adjacent its upper end is selectively operable for controlling flow of fuel to the torch. Moreover, the upper and lower wall sections of the shoe are advantageously joined along one side margin thereof, with the barrier wall comprising an extension of the interconnected upper and lower wall sections having a smaller width than the latter. The lower wall section is adapted to be moved along a lap joint area, and is accordingly flat. On the other hand, the upper wall section is designed to slide beneath the lap portion of an adjacent membrane strip, and therefore is preferably arcuate in cross-section.

In another embodiment, a diverter member is adjustably positioned within the shoe adjacent the barrier wall for directing flame from the torch downwardly for direct, high intensity application of flame; this arrangement permits proper lap welding of materials heretofore difficult or impossible to properly weld, such as the commercially available "Appremat" base material.

In a final embodiment, the shoe also carries an adjustable diverter, but in this instance the diverter and shoe are arranged for directing the torch flame upwardly through the upper wall of the shoe. This permits heating of a roofing material just prior to application thereof to roofing metal or other substrate.

BRIEF DESCRIPTION OF THE DRAWINGS

FIG. 1 is a side elevational view of a preferred torch assembly in accordance with the invention;

FIG. 2 is an enlarged, fragmentary view illustrating the lower end of the torch assembly, viewing the same from the side opposite that depicted in FIG. 1;

FIG. 3 is a fragmentary plan view of the lower end of the torch assembly, with certain parts being illustrated in phantom;

FIG. 4 is a fragmentary rear view of the lower end of the torch assembly, illustrating the orientation of the open end of the torch;

FIG. 5 is a side view similar to that of FIG. 2, but depicting the opposite side of the lower end of the torch assembly;

FIG. 6 is a fragmentary, vertical sectional view illustrating the roofing torch of the invention as used during formation of a lap joint;

FIG. 7 is a fragmentary plan view illustrating the lap joint-forming operation depicted in FIG. 6;

FIG. 8 is a fragmentary vertical sectional view of the lap joint-forming operation shown in FIGS. 6 and 7;

FIG. 9 is a fragmentary vertical sectional view illustrating a completed lap joint;

FIG. 10 is a side view of another torch assembly in accordance with the invention;

FIG. 11 is a plan view thereof;

FIG. 12 is a an end view thereof;

FIG. 13 is a bottom view thereof;

FIG. 14 is a side view of another type of torch assembly in accordance with the invention;

FIG. 15 is a plan view of the FIG. 14 embodiment;

FIG. 16 is a sectional view taken along the line 16—16 of FIG. 15;

FIG. 17 is a bottom view of the FIG. 14 embodiment;

FIG. 18 is a side view of the FIG. 14 embodiment, shown during use thereof in a roofing operation; and FIG. 19 is an end view further illustrating the operation of the FIG. 14 device.

DETAILED DESCRIPTION OF THE PREFERRED EMBODIMENT

Turning now to the drawings, and particularly FIGS. 1–5, a roofing torch assembly 10 is illustrated. Broadly speaking, the assembly 10 includes an elongated handle 12 having a shoe element 14 secured the lower end thereof. The shoe element in turn houses a tubular torch 16 which is strategically oriented for proper application of flame to a lap joint, and has a rearwardly extending flame-directing barrier wall 18.

In more detail, the handle 12 is in the form of an elongated, tubular metallic body 20 adapted to convey torch fuel therethrough. The body 20 has, adjacent its upper end and in operative communication with the interior thereof, a selectively operable fuel valve 22. In addition, an external grip 24 is provided, which has a gas tube 26 therethrough which is operably coupled with the inlet of valve 22 and adapted for connection to a flexible gas line (not shown). A loop-type auxiliary grip 28 is secured to body 20 in spaced relationship to grip 24. A metallic, generally triangular torch rest 30 is likewise affixed to the body 20, proximal to the lower end thereof.

The body 20, adjacent the lowermost end thereof. where the tube is bent to a generally horizontal orientation, is equipped with an upstanding, integrally attached, apertured web 32. The terminal end of the body 20 moreover has a threaded fixture 34 therein.

The shoe element 14 is formed of metal and includes a lower, generally flat wall section 36 together with an arcuate in cross-section upper wall section 38. The wall sections 36, 38 are joined at an apex 40 in order to present a generally triangular in cross-section shoe configuration. As shown, the apex 40 defines one side margin of the shoe, whereas the opposite side margin thereof is presented by respective, vertically spaced apart ends of the wall sections. It will also be observed that an upright connector wall 42 is connected between the upper and lower wall sections 36, 38 at the rearward end of the shoe; and that an oblique forward wall 44 serves to close the opposite end of the shoe. The upper wall section 38 also has an upstanding, integral connection bracket 46 which is apertured and designed to mate with handle web 32. Bolts 48 are employed for interconnecting the shoe element 14 to the handle 12.

The barrier wall 18 is integral with shoe 14 and is in the form of rearwardly extending extensions 36a, 38a of the corresponding wall sections 36, 38. The extensions 36a, 38a are integrally joined along apex 40a, and have a width substantially less than the wall sections 36, 38.

It will therefore be seen that the overall shoe element 14 presents a rearwardly opening, torch-receiving cavity 50 between the wall sections 36, 38 and rearwardly of forward wall 44.

The torch 16 is in the form of an elongated, metallic, cup-like torch head 52 which is secured within the cavity 50 by means of a bolt 54 extending through connector wall 42 as shown. The open end of the head 52 is positioned at the open rearward end of the shoe element 14. The opposite end of the head 52 is provided with an apertured sleeve 56 which is secured to fitting 34 and has a tubular extension 58 extending into the confines of torch head 52.

As best seen in FIGS. 2 and 3, the torch 16, and particularly head 52, is strategically located within cavity 50 for appropriate application of flame through the open rearward end of the shoe element 14. Specifically, it will be seen that the torch 16 is oriented for delivery of flame downwardly and also at an oblique (i.e., acute) angle relative to the longitudinal axis of barrier wall 18. This location of the torch 16 relative to the open rearward end of shoe element 14 and barrier wall 18 serves to properly direct flame from the open end of torch 52 along a roof joint.

Attention is next directed to FIGS. 6–8, which illustrate the assembly 10 in use during formation of a lap joint. Specifically, these views depict the formation of a built-up roof including a lowermost metallic deck 60, having a composite 62 applied thereover and secured in place by means of mastic 64. The composite 62 includes a layer of polyurethane foam insulation 66 as well as a "Perlite" uppermost roofing board 68. As shown, an additional layer 70 of roofing mastic is applied over the roofing board, and respective, side-by-side strips of roofing membrane 72, 74 are applied over the mastic layer 70. The ends of the membrane strips 72, 74 are located for overlapping as illustrated.

During lap joint formation, the torch assembly 10 is placed atop the lap joint area 76, with the overlapping end section of membrane 74 resting atop arcuate upper wall portion 38 of shoe element 14 (see FIG. 6). The torch is then fired, with gas being delivered through the tube 26 and handle 20 to the head 52; gas flow is controlled by appropriate manipulation of valve 22. As the torch is thus operated to create a flame of combustion products exiting head 52 and extending rearwardly from the shoe element 14, the entire assembly 10 is pulled forwardly in the direction of arrow 78 (FIG. 8). This serves to uniformly heat the lap joint area, with the barrier wall 18 properly guiding and deflecting the flame. As the lap joint area is thus heated, the overlapping marginal section of membrane 74 is applied to the heated membrane, and a roller or other similar device (not shown) is employed to press the membranes 74 and 72 together. This serves to complete the lap joint as best seen in FIG. 9.

FIGS. 10–13 illustrate another embodiment in accordance with the present invention. This embodiment is in many respects identical with that of FIGS. 1–9, and where identical structure or components are utilized in the two embodiments, the same reference numbers have been used with the addition of the letter "b" in connection with unlettered reference numerals used in the FIGS. 1–9 embodiment, and with the addition of the letter "c" in connection with lettered reference numerals used in the FIGS. 1–9 embodiment.

In particular, it will be observed that the second embodiment includes the identical handle 12b and shoe element 14b described previously. In this embodiment, however, the torch head 52b is supported in a cantilever fashion on the fixture 34b. A somewhat smaller torch head 52b is also preferably used.

Furthermore, the torch 10b of this embodiment is equipped with a rearmost flame diverter 80 positioned at least partially within the confines of shoe element 14b. The diverter 80 is in the form of a metallic body presenting an arcuate top wall 82, rear wall 84 and apertured sidewall 86 having arcuate forward edge 88. The forward end of diverter 80 is open and closely adjacent the outlet end of torch head 52b. The bottom of diverter 80 is open (see FIG. 13) and is positioned rearward of the trailing edge of generally planar bottom wall 36b and over the cutout defined by the wall 36b and extension 38b of the shoe element 14b.

The diverter 80 is maintained in position within shoe element 14b by means of bolt and nut assembly 90 passing through connector wall 42b and through one of the three adjustment apertures 92 provided in sidewall 86. Thus, the diverter 80 may be selectively adjusted fore and aft in shoe element 14b, thereby exposing greater or lesser amounts of the open body of the diverter 80 for passage of flame therethrough.

The use of torch 10b is very similar to that of the first embodiment. The torch head 52b is lit, and flame and combustion products are directed rearwardly and thence downwardly through the open bottom of diverter 80. This creates an intense heating effect directly below the diverter for effective lap joint formation. Of course, during use the torch 10b is pulled along a pair of overlapped sections of roofing material, in order to establish a welded joint therebetween.

FIGS. 14-19 illustrate the construction and use of a third torch embodiment 10d in accordance with the invention. This embodiment is very similar to that shown in FIGS. 11-13, and again where identical structure or components are utilized in the two embodiments, the same reference numbers have been used with the addition of the letter "d" in connection with letter "b" reference numerals from the FIG. 10-13 embodiment, and with the addition of the letter "e" in connection with the letter "c" reference numerals from the FIG. 10-13 embodiment.

Specifically, the third embodiment includes the identical handle 12d, with a modified shoe element 14d. As illustrated, the torch head 52d is supported in a cantilever fashion on fixture 34d. As best seen in FIG. 15, the shoe element 14d includes a lower, generally flat wall section 36d together with an arcuate in cross section upper wall section 38d and an oblique forward wall 44d. The walls 36d, 38d are joined at apex 40d. An upright connector wall 42d extends between the walls 36d and 38d as best seen in FIG. 14. Rearwardly extension walls 36e, 38e are also provided, which are joined along apex 40e.

The torch 10d is equipped with rearmost flame diverter 94 positioned at least partially within the confines of shoe element 14d. The diverter 94 is in the form of a metallic body presenting an arcuate top wall 96, bottom wall 98, side wall 99 and upright end wall 100. The forward end of diverter 104 is open and is adjacent the outlet end of torch head 52d. A flame exit opening 102 is provided between top wall 96 and the upper extent of end wall 100, it will be observed that the opening 102 is positioned rearwardly of shoe top wall 38d. Additionally, a top wall extension 104 is secured to and extends rearwardly from the upper margin of end wall 100 in order to provide sliding support for a roofing material during use of the torch 10d. As best shown in FIG. 17, the bottom of diverter 94 is closed to prevent passage of flame downwardly.

The diverter 94 is maintained in position within shoe element 14d by means of bolt and nut assembly 106 passing through connector wall 32b and an appropriately located aperture in sidewall 99. As in the preceding embodiment a series of connection openings can be provided for adjusting the location of diverter 94 to expose greater or lesser amounts of opening 102.

The use of torch 10d is illustrated in FIGS. 18-19. As can be appreciated, the presence of diverter 94 serves to direct flame and combustion products upwardly through opening 102. This creates an intense heating effect directly above the diverter. As shown in FIGS. 18-19, the torch 10d is particularly useful for the application of base roofing material 108 directly to a metal deck 110 or other similar substrate. In particular, the torch is lit and shoe 14d is placed under the margin of material 108, and specifically with such margin lying on shoe wall 38d and extension wall 104. This ensures that flame and combustion products are directed upwardly directly against the margin material 108 for rapid heating thereof. The torch 10d is pulled in the direction of the arrow of FIG. 18 so as to successively heat sections of the material margin. As the torch is so moved, the heated material 108 is then attached by pressure roller or similar means to the underlying deck 110.

I claim:

1. A torch assembly for use in fabricating roof joints or the like, said assembly comprising:
   an elongated handle presenting an upper end and a lower end;
   an elongated shoe element operably coupled to said handle adjacent the lower end thereof and presenting upper and lower wall sections cooperatively defining a torch-receiving cavity therebetween, said lower wall section being substantially planar and having a rearward trailing edge, said trailing edge defining a portion of an open rearward end of said elongated shoe element;
   a torch located within said cavity and oriented for delivery of a flame rearwardly within the shoe element;
   a diverter carried by said shoe element at said open rearward end rearwardly of said torch and including walls for diverting said flame in a direction substantially transverse to the longitudinal axis of shoe element;
   a means for mounting said diverter onto said shoe, and for permitting fore and aft adjustment of the diverter on said shoe; and
   a means for delivering fuel to said torch.

2. The torch assembly of claim 1, said mounting means including a connector wall spanning said upper and lower wall sections, there being connecting means releasably securing said diverter to said connector wall.

3. The torch assembly of claim 1, said handle comprising an elongated gas delivery tube with the lower end of the tube operably coupled with an end of said torch remote from said open rearward end, said fuel delivery means including a selectively operable valve.

4. The torch assembly of claim 1, said upper and lower wall sections being interconnected along a common margin, said upper wall section being arcuate in cross-section.

5. The torch assembly of claim 1, including an obliquely oriented front wall interconnecting said upper and lower wall sections and closing the forward end of said shoe element.

6. The torch assembly of claim 1, said diverter including walls for directing said flame upwardly beyond the upper wall section of said shoe element.

7. The torch assembly of claim 1, said diverter including walls for directing said flame downwardly beyond the lower wall section of said shoe element.

8. A torch assembly for use in fabricating roof joints or the like, said assembly comprising:
- an elongated handle presenting an upper end and a lower end;
- a shoe element extending from a forward end to a rearward end and operably coupled to said handle adjacent the lower end thereof, and presenting opposed upper and lower wall sections cooperatively defining a torch-receiving cavity therebetween, said upper wall having structure defining an opening therethrough intermediate said forward and rearward ends;
- a torch located within said cavity and oriented for delivery of flame rearwardly within the shoe element;
- a diverter carried by said shoe element rearwardly of said torch and including a wall for diverting said flame upwardly through said opening; and
- a means for delivering fuel to said torch.

9. A torch assembly for use in fabricating roof joints or the like, said assembly comprising:
- an elongated handle presenting an upper end and a lower end;
- a shoe element extending from a forward end to a rearward end and operably coupled to said handle adjacent the lower end thereof, and presenting opposed upper and lower wall sections cooperatively defining a torch-receiving cavity therebetween, said lower wall having structure defining an opening therethrough intermediate said forward and rearward ends;
- a torch located within said cavity and oriented for delivery of flame rearwardly within the shoe element;
- a diverter carried by said shoe element rearwardly of said torch and including a wall for diverting said flame downwardly through said opening; and
- a means for delivering fuel to said torch.

* * * * *